United States Patent Office 3,424,718
Patented Jan. 28, 1969

3,424,718
COPOLYMERS OF AROMATIC TETRACARBOXYLIC ACIDS WITH AT LEAST TWO ORGANIC DIAMINES
Rudolph J. Angelo, Wilmington, Del., assignor to E. I. du Pont de Nemours and Company, Wilmington, Del., a corporation of Delaware
No Drawing. Filed Sept. 23, 1964, Ser. No. 398,784
U.S. Cl. 260—47          4 Claims
Int. Cl. C08g 30/02

ABSTRACT OF THE DISCLOSURE

Copolyamide-acids and copolyimides from aromatic tetracarboxylic dianhydrides with at least two organic diamines, one of which is an aromatic diamine and the other is an aryl aliphatic diamine. The copolyimides are useful as adhesives and are film forming.

---

This invention relates to copolyamide-acids and copolyimides. More particularly, this invention is directed to a class of novel copolyamide-acids and novel copolyimides, the latter having enhanced flowability together with high thermal stability.

The intractability of most of the aromatic polyimides has been an obstacle to those wishing to shape the polyimides themselves or to fasten them to themselves or to other materials. The latter problem can be solved by use of polypyromellitimides of aliphatic diamines, but these suffer from markedly inferior thermal stabilities.

According to the present invention a novel class of copolyimides has outstanding flowability and yet at the same time has excellent thermal stability, thus providing a new class of copolyimides having a particularly advantageous combination of properties.

The composition of this invention are copolymers of aromatic tetracarboxylic acids with at least two organic diamines, one of which is an aromatic diamine and the other of which is an aryl aliphatic diamine.

The aromatic tetracarboxylic acids within the scope of this invention are those of the formula:

(1)

$$\text{HOOC} \diagdown \diagup \text{COOH}$$
$$\text{R}$$
$$\text{HOOC} \diagup \diagdown \text{COOH}$$

where R is a tetravalent aromatic organic radical including the following and substituted derivatives thereof:

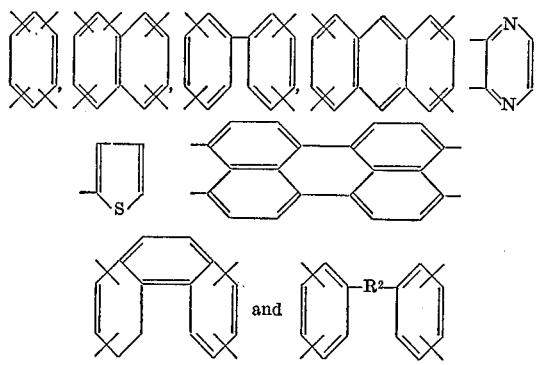

where $R^2$ is alkylene of 1–3 carbon atoms, oxygen, sulfur, or one of the following:

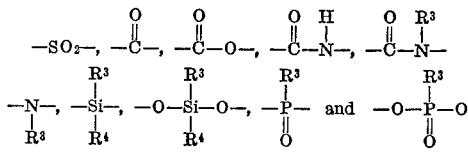

wherein $R^3$ and $R^4$ are alkyl or aryl, and substituted groups thereof.

Illustrative of such acids are the following:

pyromellitic acid
2,3,6,7-naphthalene tetracarboxylic acid
3,3',4,4'-diphenyl tetracarboxylic acid
1,2,5,6-naphthalene tetracarboxylic acid
2,2',3,3'-diphenyl tetracarboxylic acid
2,2-bis(3,4-dicarboxyphenyl) propane
bis(3,4-dicarboxyphenyl) sulfone
3,4,9,10-perylene tetracorboxylic acid
bis(3,4-dicarboxyphenyl) ether
ethylene tetracarboxylic acid
naphthalene-1,2,4,5-tetracarboxylic acid
naphthalene-1,4,5,8-tetracarboxylic acid
decahydronaphthalene-1,4,5,8-tetracarboxylic acid
4,8-dimethyl-1,2,3,5,6,7-hexahydronaphthalene-1,2,5,6-tetracarboxylic acid
2,6-dichloronaphthalene-1,4,5,8-tetracarboxylic acid
2,7-dichloronaphthalene-1,4,5,8-tetracarboxylic acid
2,3,6,7-tetrachloronaphthalene-1,4,5,8-tetracarboxylic acid
phenanthrene-1,8,9,10-tetracarboxylic acid
cyclopentane-1,2,3,4-tetracorboxylic acid
pyrrolidine-2,3,4,5-tetracarboxylic acid
pyrazine-2,3,5,6-tetracarboxylic acid
2,2-bis(2,3-dicarboxyphenyl)propane
1,1-bis(2,3-dicarboxyphenyl)ethane
1,1-bis(3,4-dicarboxyphenyl)ethane
bis(2,3-dicarboxyphenyl)methane
bis(3,4-dicarboxyphenyl)methane
bis(3,4-dicarboxyphenyl)sulfone
benzene-1,2,3,4-tetracarboxylic acid
1,2,3,4-butane tetracarboxylic acid
thiophene-2,3,4,5-tetracarboxylic acid
3,4,3',4'-benzophenone tetracarboxylic acid
2,3,2',3'-benzophenone tetracarboxylic acid
2,3,3',4'-benzophenone tetracarboxylic acid The aromatic diamine as the second essential component within the scope of the present invention has the formula $H_2N—R^1—NH_2$ where $R^1$ is a divalent aromatic radical (arylene), preferably one of the following groups: phenylene, naphthylene, biphenylene, anthrylene, furylene, benzfurylene, and (2) 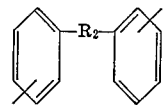

where $R^2$ is as defined above.

Illustrative of the aromatic diamines useful as just described in the present invention are the following:

meta-phenylene diamine
paraphenylene diamine
2,2-bis(4-aminophenyl)propane 4,4′-diaminodiphenyl methane
4,4′-diaminodiphenyl sulfide
4,4′-diaminodiphenyl sulfone
3,3′-diaminodiphenyl sulfone
4,4′-diaminodiphenyl ether
2,6-diaminopyridine
bis(4-aminophenyl) diethyl silane
bis(4-aminophenyl) diphenyl silane
benzidine
3,3′-dichlorobenzidine
3,3′-dimethoxybenzidine
bis(4-aminophenyl) ethyl phosphine oxide
4,4′-diaminobenzophenone
bis(4-aminophenyl) phenyl phosphine oxide
bis(4-aminophenyl)-N-butylamine
bis(4-aminophenyl)-N-methylamine
1,5-diaminonaphthalene
3,3′-dimethyl-4,4′-diaminobiphenyl
N-(3-aminophenyl)-4-aminobenzamide
4-aminophenyl-3-aminobenzoate
2,4-bis(beta-amino-t-butyl)toluene
bis(p-beta-amino-t-butylphenyl) ether
p-bis(2-methyl-4-aminopentyl) benzene
p-bis(1,1-dimethyl-5-aminopentyl) benzene
o-xylylene diamine
m-xylylene diamine
p-xylyene diamine
bis(4-aminophenyl)-N-phenylamine The aryl aliphatic diamine as the third essential component within the scope of the present invention will ordinarily constitute from about 5 to 95% by weight of the of the total amount of diamines utilized and will of course be different from the aromatic diamine which is the second essential component. The aryl aliphatic diamine will of course contain both aryl and aliphatic moieties.

Illustrative of suitable aryl aliphatic diamines are the following:

o-xylylene diamine
m-xylylene diamine
p-xylylene diamine
2,4-bis(beta-amino-t-butyl)toluene
bis-(para-beta-amino-t-butyl phenyl) ether
para-bis-(beta-methyl-delta-aminopentyl)benzene
9,9-bis-(3-aminopropyl)-fluorene
para-bis-(1,1-dimethyl-5-aminopentyl)benzene

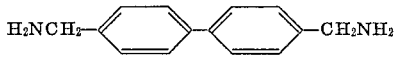

and

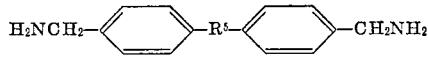

where $R^5$ is alkylene of 1-3 carbon atoms, oxygen, sulfur, or one of the following:

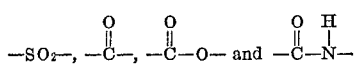

In addition to the two essential diamines as described above, the compositions of this invention can optionally use one or more other diamines which are known for making polyamide-acids and polyimides. Illustrative of such diamines are the following:

3-methylheptamethylene diamine
5-methylnonamethylene diamine
heptamethylene diamine
octamethylene diamine
nonamethylene diamine
decamethylene diamine
trimethylene diamine
tetramethylene diamine
hexamethylene diamine
2,2-dimethylpropylene diamine
1,3-trimethylpropylene diamine
1,1,6,6-tetramethylhexamethylene diamine
3,3-dimethylpentamethylene diamine
3-methylhexamethylene diamine
3-methoxyhexamethylene diamine
2,5-dimethylhexamethylene diamine
2,2,5,5-tetramethylhexamethylene diamine
bis-(3-amino propyl)-ether
1,2-bis-(3-aminopropoxy)-ethane
1,2-bis-(3-aminopropoxy)-propane
4,4-dimethylheptamethylene-diamine The copolyamide-acid compositions of this invention can be readily prepared be reacting the essential components as described above in an organic solvent for at least either the acid or diamine components, the solvent being inert to the reactants, preferably under anhydrous conditions, for a time and at a temperature sufficient to provide a shapeable composition of copolyamide-acid. Preferably the acid component will be in the form of the corresponding tetracarboxylic acid dianhydride, as will be readily understood. Reaction conditions suitable for this type of reaction are known in the art.

The copolyamide-acid can be readily converted to the corresponding copolyimide by known techniques, including for example heat treatment at temperatures above about 50° C., or chemical treatment with a dehydrating agent such as acetic anhydride alone or in combination with a tertiary amine such as pyridine, or a combination chemical and heat treatment.

Instead of preparing the copolyimides through the copolyamide-acid route, the copolyimides can be prepared via copolyamide-esters, copolyamide-amides, or other alternative intermediates.

Copolyimides within this invention have enhanced flowability and are useful as adhesives. Some of them are melt-formable and have significantly reduced color compared with many known homopolyimides.

In the examples hereinafter, the inherent viscosity is measured at 30° C. at a concentration of 0.5% by weight of the polymer in a suitable solvent, e.g. N,N-dimethyl-acetamide. To calculate inherent viscosity, the viscosity of the polymer solution is measured relative to that of the solvent alone.

$$\text{Inherent viscosity} = \frac{\text{natural logarithm} \frac{\text{Viscosity of solution}}{\text{Viscosity of solvent}}}{C}$$

where C is the concentration expressed in grams of polymer per 100 milliliters of solution. As known in the polymer art, inherent viscosity is directly related to the molecular weight of the polymer.

Modulus is a measure of film stiffness, that is, the higher the modulus the greater the stiffness, and modulus as used herein is the slope of the initial portion of the stress/strain curve at 1% elongation, the film being elongated at a rate of 100% per minute or less.

Tenacity as used herein is based upon the cross-sectional area of the film being measured and is determined by elongating a film sample at a rate of 100% per minute or less until the film sample breaks.

Elongation is the percent increase in length at the break of the film in the preceding test.

Density as used herein is determined by preparing the sample as described in ASTM–1248–60T and measuring its density following the method of ASTM–D–1505–57T.

The invention will be more clearly understood by referring to the examples which follow. These examples, which illustrate specific embodiments of the present invention, should not be construed to limit the invention in any way.

EXAMPLE 1

To a solution of 10.0 grams of bis(4-aminophenyl) ether and 6.8 grams of m-xylylene diamine in 218.7 grams of N,N-dimethylacetamide was added with stirring 21.8 grams of pyromellitic dianhydride at room temperature. All of the dianhydride was added within about 15 minutes, and the solution became quite warm and viscous. The concentration of solids was cut from 15% to 12% by adding more of the same solvent. The solution was stirred for about 2 hours. The inherent viscosity of the polymer (as a 0.5% by weight solution in N,N-dimethylacetamide at 30° C.) was 1.84. This represented a higher molecular weight than expected, based on the performance of aryl aliphatic diamines alone in such a reaction. The polymer contained a minimum of solid material, which is often present in the homopolymerization of m-xylylene diamine with dianhydrides. Furthermore, the relatively rapid reaction rate of aromatic diamines was also maintained. A 50/50 mole percent copolymer was obtained.

The 12% copolyamide-acid solution was cast into films using a 15 mil doctor knife. The gel films were dried in a forced draft oven at 125° C. for about 10 minutes, and then stripped from the supporting plates and placed on frames on which they were dried under vacuum overnight in a nitrogen atmosphere at about 75° C. to give copolyamide-acid films.

Another set of the same copolyamide-acid films was placed onto frames and into a vacuum oven at 300° C. for 1 hour in a nitrogen atmosphere. These films became yellow and were found to have an inherent viscosity of 1.32 (0.5% in concentrated sulfuric acid at 30° C.). The properties of the resulting copolyimide films were:

Physical properties

Modulus (p.s.i.):
   23° C. _____ 441,000
   200° C. _____ 309,000
Tenacity (p.s.i.):
   23° C. _____ 12,500
   200° C. _____ 6,600
Elongation (percent):
   23° C. _____ 4
   200° C. _____ 2
Density, gram/cc. _____ 1.408
Zero strength temperature, ±5° C. _____ 568
Thermal gravimetric analysis (in helium) ____ (1)
Crystallinity (X-ray, Laue flat plate) _____ (2)

[1] Little or no loss to 425° C.: thermal breakdown between 425–475° C.
[2] Modest crystallinity.

Electrical properties

Volume resistivity:
   23° C. _____ Off scale
   200° C. _____ Do.
Dissipation factor:
   23° C. _____ 0.002–0.008
   200° C. _____ 0.001–0.002
Dielectric constant:
   23° C. _____ 3.7
   200° C. _____ 3.0

Gel films were prepared by casting the viscous copolyamide-acid solution onto glass plates (15 mil doctor knife) and immersing the plates into a bath of pyridine/acetic anhydride (50/50 by volume) for 3–4 minutes. Bright yellow gel films of the copolyimide resulted. These were rinsed in a benzene bath for about an hour, then placed onto frames and allowed to dry in the air at room temperature overnight. These films shrank considerably. Better chemically converted copolyimide films were prepared by immersion of the copolyamide-acid films in cyclohexane/acetic anhydride/pyridine (500/50/50 parts by volume), where they were kept for 3 days. They were then rinsed with heptane twice and placed onto frames and vacuum-dried at 50° C. in a nitrogen atmosphere overnight. Inherent viscosity of the copolyimide prepared in this latter fashion was 0.34 (0.5% by weight solution in concentrated sulfuric acid at 30° C.). The properties of the copolyimide films prepared by the above chemical conversion were:

Physical properties

Modulus (p.s.i.):
   23° C. _____ 381,000
   200° C. _____ 220,000
Tenacity (p.s.i.):
   23° C. _____ 6,100
   200° C. _____ 1,700
Elongation (percent):
   23° C. _____ 2
   200° C. _____ 1
Density, gram/cc. _____ 1.333
Zero strength temperature, ±5° C. _____ 570
Thermal gravimetric analysis (in helium) _____ (1)
Crystallinity (X-ray, Laue flat plate) _____ (2)

[1] Some loss (about 10%) between 150–300° C. which was considered loss of solvent. Thermal breakdown between 425–575° C.
[2] Amorphous.

Electrical properties

Volume resistivity:
   23° C. _____ $2.1 \times 10^7$
   200° C. _____ $2.3 \times 10^{12}$
Dissipation factor:
   23° C. _____ 0.007–0.014
   200° C. _____ 0.006–0.015
Dielectric constant:
   23° C. _____ 3.9
   200° C. _____ 3.4

Thus, the copolyamide-acid solutions can be thermally or chemically converted into tough, flexible copolyimide films. It was also found that a copolyamide-acid solution containing chemical converting agents (pyridine and acetic anhydride) could be held for about 20 hours at room temperature without the formation of much gel or other insoluble material. This solution of converted, or partially converted, copolyimide was cast on a glass plate, solvent evaporated at 125° C. for 5 minutes to give flexible,, copolyimide films.

EXAMPLE 2

To a solution of 0.02 mole each of 2,4-bis(beta-amino-t-butyl) toluene and bis(4-aminophenyl) ether in N,N-dimethylacetamide is added 0.04 mole of pyromellitic dianhydride with vigorous agitation. After several hours' stirring at room temperature, the polymer is tested for making aluminum lap joints, as described below, and found to be satisfactory.

EXAMPLE 3

The following diamines were dissolved in 202 grams of N,N-dimethylacetamide:

6.32 garms (0.04 mole) of 1,9-diaminononane
0.90 gram (0.01 mole) of 1,3-diaminopropanol-2
6.80 grams (0.05 mole) of m-xylylenediamine Then 21.8 grams (0.10 mole) of pyromellitic dianhydride was added with vigorous agitation, which was continued for about 4.5 hours. The solution was relatively viscous, and the inherent viscosity of the polymer was 0.48 (0.5% by weight solution in N,N-dimethylacetamide at 30° C.).

A portion of this solution was cast onto a glass plate, which was placed in an oven at 100° C. for 10–15 minutes. The resulting, clear, colorless film stuck tightly to the glass. After removal from the glass and vacuum drying overnight under nitrogen gas at 75° C., the film was examined by IR. The spectrum showed it to be nearly pure polyamide-acid—i.e., only a trace of polyimide.

Aluminum lap joints were made as described below. The results were as follows:

| Temp., °C./p.s.i./min. | Comments | Measured lap joint (p.s.i.) |
|---|---|---|
| 250/5/10 | Adhered tightly | 870 |
| 300/5/10 | do | 1,246 |
| 350/5/10 | do | 504 |

EXAMPLE 4

Using the procedure of Example 3, a 15% by weight solids solution was made of a polyamide-acid based on the following mixture of starting materials:

| | Mole |
|---|---|
| Bis(4-aminophenyl) ether | 0.025 |
| 2,4-diaminodiphenyl ether | 0.025 |
| 1,9-diaminononane | 0.025 |
| m-Xylylenediamine | 0.025 |
| Pyromellitic dianhydride | 0.100 |

The inherent viscosity of the polymer was 0.83. When cast onto a glass plate and dried, it produced a clear, tightly adhered film.

Ethyl acetate was added to a portion of the 15% copolyamide-acid solution to precipitate the polymer. The white fibrous mass was heated for an hour under nitrogen gas at about 75° C. Then it was pressed at 300° C. for 30 seconds under a 10 ton load to give a clear, flexible, tough film. The IR spectrum of the film showed that conversion to polyimide had occurred.

EXAMPLE 5

A mixture of 4.00 grams (0.02 mole) of bis(4-aminophenyl) ether and 2.72 grams (0.02 mole) of m-xylylene diamine was dissolved in 130 grams of N,N-dimethylacetamide. Then a mixture of 4.44 grams (0.01 mole) of 2,2-bis(3,4-dicarboxyphenyl) hexafluoropropane dianhydride and 6.54 grams (0.03 mole) of pyromellitic dianhydride was added slowly with stirring. The viscous solution was diluted to 12% solids by adding N,N-dimethylacetamide and stirred 2.5 hours longer. The inherent viscosity of the resulting copolyamide-acid was 0.98.

Adhesiveness in aluminum and stainless steel lap joints was demonstrated by using this copolyamide-acid solution in the test described below.

| Temp., °C./min./p.s.i. | Comments | Measured lap joints (p.s.i.) |
|---|---|---|
| ½ in. lap joints on etched aluminum: | | |
| 250/10/5 | Adhered tightly | 908 |
| 300/10/5 | do | 752 |
| 350/10/5 | do | 1,176 |
| ½ in. lap joints on etched stainless steel: | | |
| 250/10/5 | Adhered tightly | 1,280 |
| 300/10/5 | do | 160 |
| 350/10/5 | No adhesion | |

This copolyimide softens at 420–485° C.

EXAMPLE 6

A mixture of 2.72 grams (0.02 mole) of meta-xylylene diamine and 4.00 grams (0.02 mole) of bis(4-aminophenyl) ether was dissolved in 111 grams of N,N-dimethylacetamide. With stirring, a mixture of 2.36 grams (0.02 mole) of 3,4,3',4'-benzophenone tetracarboxylic dianhydride and 4.36 grams (0.02 mole) of pyromellitic dianhydride was added slowly. The inherent viscosity of the copolyamide-acid was 0.67. The copolyimide softens at 330–450° C.

Adhesiveness in aluminum lap joints was demonstrated by using the copolyamide-acid solution in the test described below.

| Temp., °C./min./p.s.i. | Comments | Measured lap joints (p.s.i.) |
|---|---|---|
| ½ in. lap joints on etched aluminum: | | |
| 250/10/5 | Adhered tightly | 180 |
| 300/10/5 | do | 156 |
| 350/10/5 | do | 154 |

EXAMPLE 7

Using the procedure of Examples 3–6, a copolyamide-acid was made from:

| | Grams |
|---|---|
| m-Xylylene diamine (0.02 mole) | 2.72 |
| Bis(4-aminophenyl) ether (0.01 mole) | 2.00 |
| 3,5-diaminobenzoic acid (0.01 mole) | 1.52 |
| 3,4,3',4'-benzophenone tetracarboxylic dianhydride (0.02 mole) | 8.36 |
| Pyromellitic dianhydride (0.02 mole) | 4.36 |
| N,N-dimethylacetamide | 108.0 |

Inherent viscosity of copolyamide-acid=0.34

| Temp., °C./min./p.s.i. | Comments | Measured lap joints (p.s.i.) |
|---|---|---|
| ½ in. lap joints on etched aluminum: | | |
| 250/10/5 | Adhered tightly | 128 |
| 300/10/5 | do | 224 |
| 350/10/5 | do | 392 |

The corresponding polyimide softens at 330–450° C.

EXAMPLE 8

By the procedure of Examples 3–6, a copolyamide acid was made from:

| | Grams |
|---|---|
| m-Xylylene diamine (0.02 mole) | 2.72 |
| Bis(4-aminophneyl) ether (0.01 mole) | 2.00 |
| 1,3-diaminopropanol-2 (0.01 mole) | 0.90 |
| 3,4,3',4'-benzophenone tetracarboxylic dianhydride (0.02 mole) | 8.36 |
| Pyromellitic dianhydride (0.02 mole) | 4.36 |
| N,N-dimethylacetamide | 105.0 |

Inherent viscosity of copolyamide acid—0.42
Softening temperature of copolyimide—approx. 310° C.
Adhesiveness:

| Temp., °C./min./p.s.i. | Comments | Measured lap joints (p.s.i.) |
|---|---|---|
| ½ in. lap joints on etched aluminum: | | |
| 250/10/5 | Adhered tightly | 208 |
| 300/10/5 | do | 108 |
| 350/10/5 | do | (¹) |
| ½ in. lap joints on etched stainless steel: | | |
| 250/10/5 | Adhered tightly | (¹) |
| 300/10/5 | do | 1,260 |
| 350/10/5 | No adhesion | |

¹ Sample broke while handling.

EXAMPLE 9

Using the copolyamide-acid solutions of Examples 1, 4 and 5, and in the film heat-sealing test described below, films of the polypyromellitimide of bis(4-aminophenyl) ether were bonded together with the following results (test results are in g./in.):

| Example | 240° C. | 300° C. | 350° C. |
|---|---|---|---|
| 1 | 260 | | |
| 4 | | 1,450 | 795 |
| 5 | | 1,575 | 980 |

Test for adhesiveness in metal lap joints: Strips of the desired metal (usually aluminum or stainless steel, about 20 mils thick and ½ inch wide) are cleaned by washing with methyl ethyl ketone, the residue of which is removed. Then the strpis are dipped into a chromic acid solution for 10 minutes at 65° C., rinsed with distilled water and dried in a 150° C. air oven for 20-30 minutes. The copolyamide-acid solution to be tested is painted onto one side of one end of each of the two metal strips to be bonded together. The thickness of the coating of solution is enough to give about 1 mil of adhesive layer in semi-dry condition, which is attained by oven drying until the layer is nearly dry but still just barely tacky. Then about ½ inch of the coated sides are lapped together and bonded under the conditions recited in each table of results. A considerable amount of imidization results, and the bond strength is measured by pulling from the ends of the strips.

Polyimide film heat-seals are prepared as follows: Strips of film about 3 mils thick are solvent coated on the sides to be bonded, using a solution of the copolyamide-acid to be tested. The coating layers are such that a non-tacky layer approximately 1 mil thick is left on each film after heating at 140° C. for 1 hour. The coated films are pressed together at 240° C. for 2 seconds under 90 p.s.i.; and at 300° C. and 350° C. for 30 seconds under 150 p.s.i. Seal strengths are measured on a Suter peel tester.

EXAMPLE 10

When 95:5 and 5:95 mole percent mixtures of m-xylene diamine and bis(4-aminophenyl) ether are substituted as the diamine mixture in the procedure of Example 3, the corresponding copolyamide-acids result. These are suitable as adhesives for bonding aluminum sheets together by the above procedure, and they are convertible to the corresponding copolyimides either during the bonding operation or when heated separately in film form.

The foregoing examples can be repeated, as will be readily understood by persons skilled in this art, by substituting other materials within the indicated scope of this invention for those of the specific exemplifications.

It is to be understood that the foregoing detailed description is given merely by way of illustration and that many variations may be made therein without departing from the spirit or scope of this invention.

The invention claimed is:

1. A normally solid copolyimide of an aromatic tetracarboxylic acid and at least three different diamines, two of said diamines being aromatic diamines and the other of said diamines being an aryl aliphatic diamine having an alkylene group of 1-8 carbon atoms interposed between an aromatic ring and each amine group.

2. A normally solid copolyamide-acid of an aromatic tetracarboxylic acid and at least three different diamines, two of said diamines being aromatic diamines and the other of said diamines being an aryl aliphatic diamine having an alkylene group of 1-8 carbon atoms interposed between an aromatic ring and each amine group.

3. A normally solid copolyimide of an aromatic tetracarboxylic acid and at least three different diamines, two of said diamines being aromatic diamines and the other of said diamines being an aryl aliphatic diamine, said aromatic tetracarboxylic acid having the formula $$\begin{array}{c} HOOC \\ \diagdown \\ \end{array} R \begin{array}{c} COOH \\ \diagup \\ \end{array}$$
$$\begin{array}{c} \diagup \\ HOOC \end{array} \begin{array}{c} \diagdown \\ COOH \end{array}$$

where R is a tetravalent aromatic organic radical selected from the group consisting of

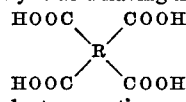

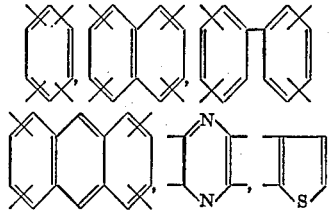

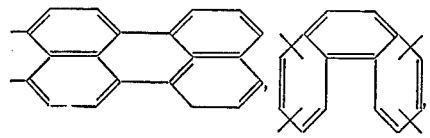

and

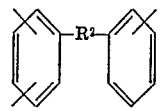

where $R^2$ is selected from the group consisting of alkylene of 1-3 carbon atoms, oxygen, sulfur.

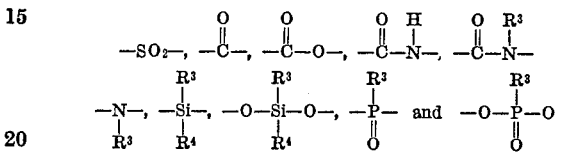

wherein $R^3$ and $R^4$ are selected from the group consisting of alkyl and aryl; said aromatic diamine having the formula $H_2N-R^1-NH_2$ where $R^1$ is selected from the group consisting of phenylene, naphthylene, biphenylene, anthrylene, furylene, benzfurylene and

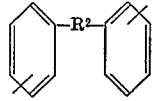

where $R^2$ has the same meaning as above; and said aryl aliphatic diamine is selected from the group consisting of o-xylylene diamine;
m-xylylene diamine;
p-xylylene diamine;
2,4-bis(beta-amino-t-butyl) toluene;
bis(para-beta-amino-t-butyl phenyl) ether;
bis-para-(beta-methyl-delta-aminopentyl) benzene;
9,9-bis(3-aminopropyl)fluorene;
bis-para-(1,1-dimethyl-5-aminopentyl) benzene;

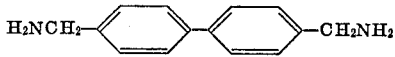

and

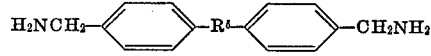

where $R_5$ is selected from the group consisting of alkylene of 1-3 carbons, oxygen, sulfur,

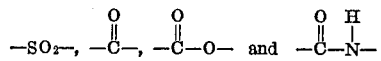

4. A normally solid copolyamide-acid of an aromatic tetracarboxylic acid and at least three different diamines, two of said diamines being aromatic diamines and the otehr of said diamines being an aryl aliphatic diamine, said aromatic tetracarboxylic acid having the formula

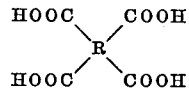

where R is a tetravalent aromatic organic radical selected from the group consisting of

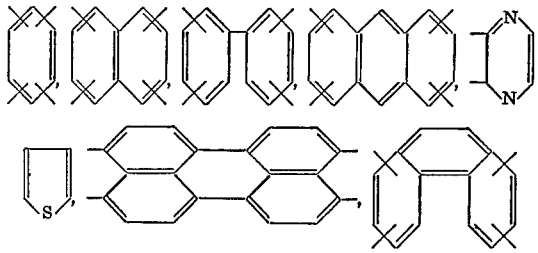

and

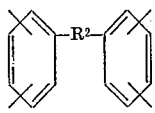

where $R^2$ is selected from the group consisting of alkylene of 1–3 carbon atoms, oxygen, sulfur,

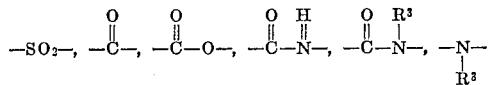

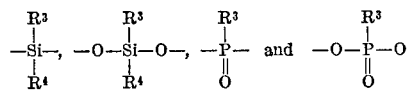

wherein $R^3$ and $R^4$ are selected from the group consisting of alkyl and aryl; said aromatic diamine having the formula $H_2N-R^1-NH_2$ where $R^1$ is selected from the group consisting of phenylene, naphthylene, biphenylene, anthrylene, furylene, benzfurylene and

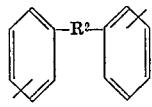

where $R^2$ has the same meaning as above; and said aryl aliphatic diamine is selected from the group consisting of o-xylylene diamine;
m-xylylene diamine;
p-xylylene diamine;
2,4-bis(beta-amino-t-butyl) toluene;
bis(para-beta-amino-t-butyl phenyl) ether;
9,9-bis(3-aminopropyl)fluorene;
bis-para-(1,1-dimethyl-5-aminopentyl) benzene;

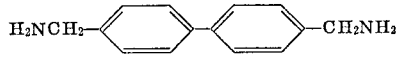

and

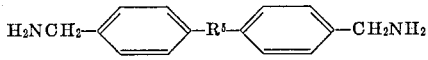

where $R^5$ is selected from the group consisting of alkylene of 1–3 carbons, oxygen, sulfur,

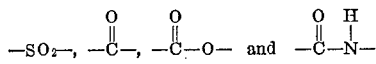

References Cited
UNITED STATES PATENTS
3,179,614   4/1965   Edwards _____ 260—78

WILLIAM H. SHORT, *Primary Examiner.*

F. D. ANDERSON, *Assistant Examiner.*

U.S. Cl. X.R.

117—161; 161—227; 260—32.6, 65, 78